United States Patent
Furlan et al.

(10) Patent No.: US 11,321,565 B2
(45) Date of Patent: May 3, 2022

(54) AUGMENTED REALITY SYSTEM FOR POSITIONING OBJECTS WITHIN AN INTERIOR SPACE

(71) Applicant: Capital One Services, LLC, McLean, VA (US)

(72) Inventors: Elizabeth Furlan, McLean, VA (US); Steven Dang, McLean, VA (US); Chih-Hsiang Chow, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 141 days.

(21) Appl. No.: 16/861,071

(22) Filed: Apr. 28, 2020

(65) Prior Publication Data

US 2021/0334536 A1    Oct. 28, 2021

(51) Int. Cl.
| G06K 9/00 | (2006.01) |
| B60R 11/04 | (2006.01) |
| G06T 19/20 | (2011.01) |
| G06T 19/00 | (2011.01) |
| G06T 7/73 | (2017.01) |

(52) U.S. Cl.
CPC .......... G06K 9/00671 (2013.01); B60R 11/04 (2013.01); G06K 9/00832 (2013.01); G06T 7/74 (2017.01); G06T 19/006 (2013.01); G06T 19/20 (2013.01); B60R 2300/8006 (2013.01); G06T 2207/30268 (2013.01)

(58) Field of Classification Search
CPC combination set(s) only.
See application file for complete search history.

(56) References Cited

U.S. PATENT DOCUMENTS

| 10,540,821 | B2* | 1/2020 | Musunuri | G06K 9/03 |
| 11,142,342 | B2* | 10/2021 | Podnar | G06Q 10/043 |
| 2015/0130592 | A1* | 5/2015 | Lakshminarayanan | B65G 67/20 340/10.1 |
| 2019/0213529 | A1* | 7/2019 | Donnelly | G06Q 10/087 |
| 2020/0184724 | A1* | 6/2020 | Schell | G06K 9/6202 |
| 2020/0283245 | A1* | 9/2020 | Gualtieri | G06Q 10/04 |
| 2021/0319582 | A1* | 10/2021 | Sangeneni | G06T 7/62 |

OTHER PUBLICATIONS

Karásek, Miroslav, and K. Karásek. "Application for Automatic Measuring of Objects in Augmented Reality." (2019). (Year: 2019).*

* cited by examiner

*Primary Examiner* — Ryan M Gray
(74) *Attorney, Agent, or Firm* — Perkins Coie LLP

(57) ABSTRACT

In certain embodiments, placement of objects within an interior space of a vehicle may be simulated. In some embodiments, one or more images of an interior space of a vehicle may be obtained. User input may be obtained, the user input indicating objects to be placed within the interior space. Based on the images of the interior space and the user input indicating objects to place within the interior space, an arrangement may be determined for the objects within the interior space. In some embodiments, the arrangement may be based upon measurements and other characteristics of the objects and the interior space. In some embodiments, a presentation simulating placement of the objects within the interior space may be simulated. In some embodiments, the presentation may comprise steps indicating an order in which to place the objects within the interior space.

22 Claims, 5 Drawing Sheets

AUGMENTED REALITY SYSTEM FOR POSITIONING OBJECTS WITHIN AN INTERIOR SPACE

FIELD OF THE INVENTION

The invention relates to augmented reality positioning of objects within an interior space, for example, using characteristics of the objects and of the interior space to determine positioning.

BACKGROUND OF THE INVENTION

Advances in computing and software technologies have made it possible for users to obtain information about items for sale that may inform purchasing decisions (e.g., based on searches of such items). Despite such advancements, the available information relates only to the items themselves and does not inform users how the items may serve the user's needs or affect other items belonging to the user. As an example, with respect to vehicles, users may find information about the measurements of a vehicle but may not be able to determine how well specific items (e.g., default items, the user's items, or other items) may fit together in the vehicle based on characteristics of the items. Thus, the user is unable to accurately determine how the vehicle may accommodate the user's item transportation needs. These and other drawbacks exist.

SUMMARY OF THE INVENTION

Aspects of the invention relate to methods, apparatuses, or systems for facilitating augmented reality positioning of objects within an interior space (e.g., interior cargo space of a vehicle) based on characteristics of the objects and the interior space.

In some embodiments, one or more images of an interior space (e.g., interior cargo space) may be obtained via a camera, and the interior space images may be used to determine an arrangement of one or more objects within the interior space. As an example, a three-dimensional mapping of the interior space may be generated based on a plurality of perspectives depicted in the interior space images from the camera, and the arrangement may be determined based on the three-dimensional mapping and measurements of the objects. Based on the determined arrangement, an augmented reality presentation may be generated to simulate placement of the objects within the interior space. In some embodiments, the augmented reality presentation may simulate placement of the objects in accordance with a plurality of placement steps for placing the objects in the interior space, where such placement steps are in accordance with the determined arrangement.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
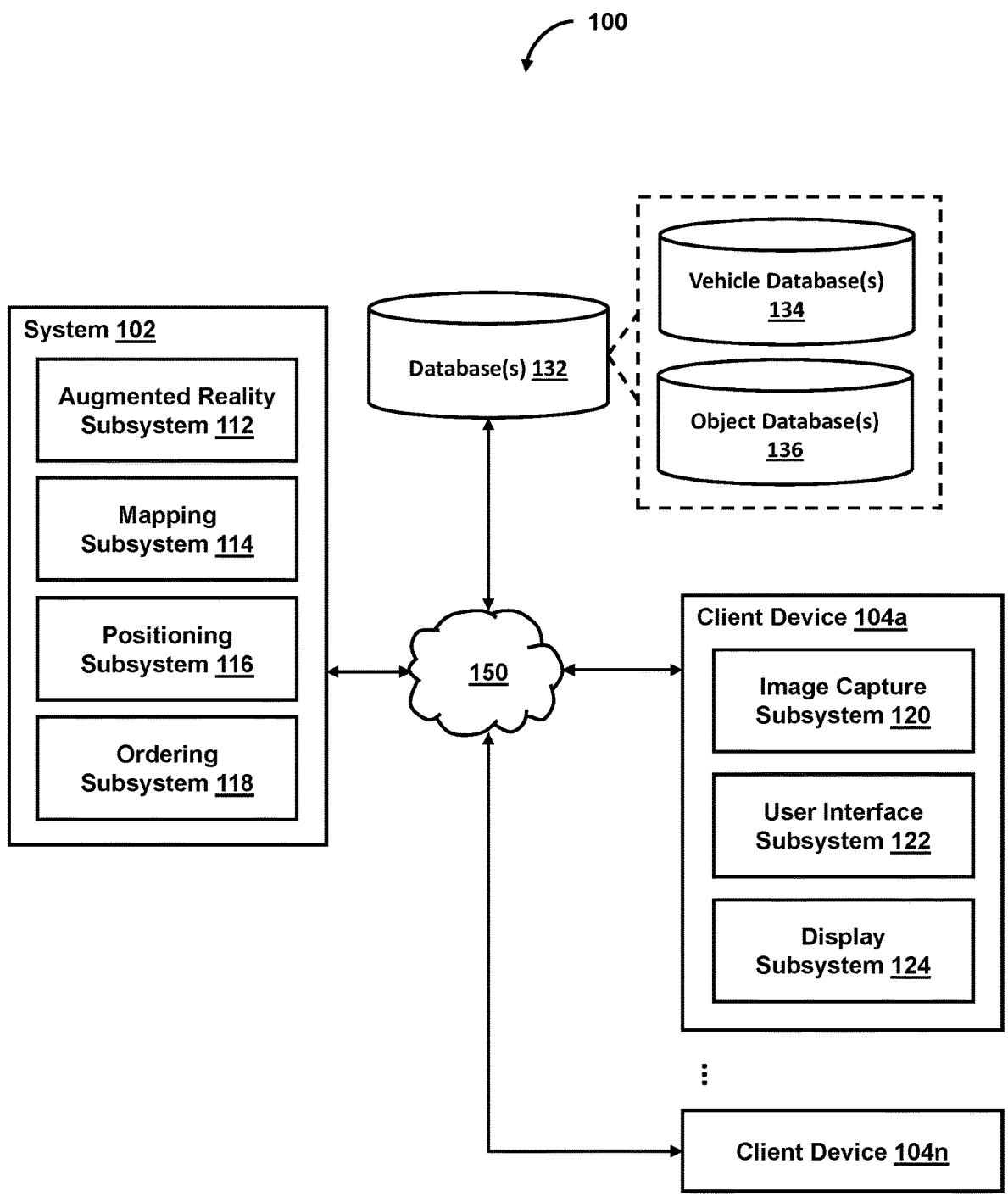
FIG. 1 shows a system for facilitating augmented reality positioning of objects within an interior space, in accordance with one or more embodiments.

FIG. 1 shows a system 100 for facilitating augmented reality positioning of objects within an interior space, in accordance with one or more embodiments. As shown in FIG. 1, system 100 may include system 102, client device(s) 104 (or client devices 104*a*-104*n*), or other components. System 102 may include augmented reality subsystem 112, mapping subsystem 114, positioning subsystem 116, ordering subsystem 118, or other components. Each client device 104 may include image capture subsystem 120, user interface subsystem 122, display subsystem 124, or other components. Each client device 104 may include any type of mobile terminal, fixed terminal, or other device. By way of example, client device(s) 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of system 102, those operations may, in some embodiments, be performed by other components of system 102 or other components of system 100. As an example, while one or more operations are described herein as being performed by components of system 102, those operations may, in some embodiments, be performed by components of client device(s) 104.

In some embodiments, system 100 may facilitate augmented reality positioning of objects (e.g., cargo objects) within an interior space (e.g., interior cargo space of a vehicle) based on characteristics of the interior space and characteristics of the objects. In some embodiments, system 100 may take into account factors, such as measurements of the interior space, flexibility of the measurements of the interior space, measurements of the objects, or other factors. In some embodiments, system 100 may present the user with an arrangement for placing the objects within the interior space. In some embodiments, system 100 may account for user input factors, such as fragility, rigidity, maneuverability, orientation, priority, or other aspects of the objects. System 100 may output one or more arrangements of the objects, one or more presentations of placing the objects in the interior space, a series of steps for placing the objects in the interior space, or other outputs. System 100 (and all subsystems contained therein) thus provides the user with information necessary to fit the objects in the interior space according to any preferences of the user or characteristics of the interior space or objects.

In some embodiments, system 100 may obtain one or more images of an interior space (e.g., via image capture subsystem 120 of client device(s) 104). The interior space may be an interior space of a vehicle, storage container, room, or other space. The images of the interior space may include a series of images, a video stream, a scan, or other images. The images may capture multiple perspectives of the interior space. System 100 may use the images of the interior space to determine measurements of the interior space. System 100 may compare the images to database 132. Database 132 may include vehicle database 134 and object database 136. For example, system 100 may compare the captured images to images of vehicles in vehicle database 134 in order to identify a matching vehicle. A match may be identified when one or more of the images captured by the images matches an entry in database 132. Once a matching vehicle is identified, system 100 may retrieve measurement information for the identified vehicle from vehicle database 134. In some embodiments, the measurement information about the identified vehicle may include carrying capacity, size and shape of trunk space, size and shape of additional space, maneuverability of seats, or other information. In some embodiments, measurement information about the interior space may be determined without retrieving information from database 132. For example, augmented reality subsystem 112 may perform augmented-reality-based measuring based on the images of the interior space of the vehicle in order to determine measurement information about the interior space of the vehicle (as described in further detail below).

In some embodiments, system 100 may obtain user input indicating objects to be placed within the interior space of a vehicle. In some embodiments, the user input may comprise a selection (e.g., via user interface subsystem 122 of client device(s) 104) of default objects (e.g., suitcases, instruments, equipment, boxes, bags, or other objects) to be placed within the interior space. In some embodiments, the default objects may comprise preprogrammed measurements (e.g., for a carry-on suitcase, a guitar case, or other standard objects) or may allow the user to input or scale measurements of the default objects. In some embodiments, the user input may comprise an upload of one or more images of objects to be placed within the interior space. For example, the upload may comprise one or more images that have been captured (e.g., via image capture subsystem 120 of client device(s) 104) of objects belonging to the user. In some embodiments, system 100 may prompt the user to input measurements of the objects. In some embodiments, system 100 may compare the captured images to images of objects in object database 136 in order to identify a matching object. A match may be identified when one or more of the images matches an entry in database 132. Once a matching object is identified, system 100 may retrieve measurement information about the identified object from object database 136. For example, system 100 may identify a matching guitar case and retrieve measurements for the guitar case from object database 136. In some embodiments, the measurement information about the object may include measurements, dimensions, shape, or other information about the object. In some embodiments, object database 136 may also store information relating to fragility, rigidity, weight, maneuverability, or other characteristics of the objects in the database. In some embodiments, system 100 may determine measurement information about the objects without retrieving information from database 132. For example, augmented reality subsystem 112 may perform augmented-reality-based measuring of the objects based on the images of the objects in order to determine measurement information about the objects (as described in further detail below).

In some embodiments, image capture subsystem 120 may comprise a camera or other optical sensor. Image capture subsystem 120 may capture one or more images, a video stream, a scan, or other types of images. In some embodiments, image capture subsystem 120 may comprise communication links to user interface subsystem 122, display subsystem 124, or to other components of system 100 (e.g., via network 150). In some embodiments, user interface subsystem 122 may be configured to provide an interface between system 100 and the user or other users through which the user or other users may provide information to and receive information from system 100. This enables data, cues, preferences, or instructions and any other communicable items, collectively referred to as "information," to be communicated between the user and the various components of system 100. In some embodiments, user interface subsystem 122 may be or be included in a computing device, such as a desktop computer, a laptop computer, a smartphone, a tablet computer, or other computing devices. Such computing devices may run one or more electronic applications having graphical user interfaces configured to provide information to or receive information from users. In some embodiments, user interface subsystem 122 may include or communicate with display subsystem 124. For example, one or more default objects, one or more vehicle models, one or more arrangements of objects, one or more presentations, or other displays may be presented to the user via user interface subsystem 122 or display subsystem 124. It should be noted that although image capture subsystem 120, user interface subsystem 122, and display subsystem 124 are shown in FIG. 1 within a single client device 104*a*, this is not intended to be limiting. For example, each subsystem may exist together or separately within one or more client device(s) 104.

In some embodiments, augmented reality subsystem 112 may receive one or more images of an interior space or one or more objects (e.g., cargo objects) via image capture subsystem 120. Augmented reality subsystem 112 may identify relevant points (e.g., anchor points) within the images. For example, edges, corners, surfaces, or other relevant points may be identified. In some embodiments, augmented reality subsystem 112 may identify the same relevant points in different images from different perspectives. In some embodiments, augmented reality subsystem 112 may compare the difference in the locations, distances, spacing, or other characteristics of the relevant points across multiple images (i.e., from multiple perspectives) in order to determine measurements of an interior space or measurements of an object in the images. In some embodiments, measurements of the vehicle may be determined using characteristics of image capture subsystem 120 (e.g., a camera lens) and distance to the vehicle. For example, augmented reality subsystem 112 may determine the field of view of a camera lens and the portion of the lens that an object or space takes up, as well as a distance to the object or space (e.g., using known image processing techniques). Augmented reality subsystem 112 may then determine one or more measurements of the object or space using the known angle and length (e.g., using the pythagorean theorem or another mathematical technique). In some embodiments, other characteristics of image capture subsystem 120 and other elements of the object or space to be measured may be used (e.g., using other mathematical or image processing techniques). In some embodiments, the measurements determined by augmented reality subsystem 112 may be output to mapping subsystem 114.

In some embodiments, mapping subsystem 114 creates a three-dimensional map of the interior space of the vehicle based on the images of the interior space, measurements of the interior space, or other information. For example, mapping subsystem 114 may receive one or more images (e.g., from image capture subsystem 120 of client device(s) 104), one or more measurements (e.g., from vehicle database 134 or augmented reality subsystem 112), or additional information from other sources. In some embodiments, the measurements may comprise multiple measurements, each corresponding to portions of the interior space of the vehicle. For example, one set of measurements may correspond to a rectangular portion of the interior space (e.g., from the floor to the windows). Another set of measurements may correspond to irregularly shaped portions of the interior space (e.g., a portion of the interior space against an angled window of the vehicle). In some embodiments, irregularly shaped portions of the interior space may be further broken down into regularly shaped portions.

In some embodiments, certain portions of the interior space may have flexible measurements. For example, the interior space may extend into seating areas of the vehicle. In some embodiments, seats in a vehicle may collapse to allow for more area within the interior space. In some embodiments, the interior space available for objects may extend over certain seats and may not extend over other seats. For example, a long object may extend over a seat not occupied by a passenger but may not extend over a seat occupied by a passenger. In some embodiments, certain portions of the interior space may be excluded from the mapping (e.g., a portion of the interior space which must remain clear for visibility purposes). In some embodiments, flexible measurements of the interior space may be identified by the user. For example, the user may input flexible measurements via image capture subsystem 120 or user interface subsystem 122. The user may input the flexible measurements by capturing one or more images of the additional space within the interior space. For example, if certain seats are collapsible to allow for additional cargo space, the user may capture one or more images of the space, both with the seats collapsed and with the seats not collapsed. The mapping subsystem 114 may therefore create multiple mappings of the interior space for multiple scenarios (e.g., no seats collapsed, one seat collapsed, multiple seats collapsed, etc.). In some embodiments, portions of additional interior space may be included in the mapping. For example, the user may not wish to collapse any seats but may allow objects to extend over unoccupied seats (e.g., long objects). The user may therefore input preferences for portions of additional space that may be occupied by objects. In some embodiments, mapping subsystem 114 may obtain flexible measurements from a database 132 (e.g., vehicle database 134). For example, vehicle database 134 may comprise information about additional storage space within the vehicle. Mapping subsystem 114 may therefore obtain the flexible measurements from vehicle database 134.

In some embodiments, once multiple mappings (or multiple versions) of the interior space have been determined by mapping subsystem 114, the user may later input a selection of the desired mapping or version or a portion of the desired mapping or version (e.g., based on how many seats are collapsed or how many passengers are riding in the vehicle at the time). In some embodiments, once a particular mapping, version, or portion is selected, the user may recreate the layout of the mapping within the vehicle. For example, the user may be instructed to collapse any seats that are collapsed in the mapping, vacate any seats that are indicated as vacant in the mapping, remove any objects from the interior space which are not to be included in the arrangement, or make any other required changes. In some embodiments, these requirements may be output to the user as a series of steps (e.g., steps for preparing the interior space). In some embodiments, the steps for preparing the interior space may be output with steps for placing objects within the interior space (e.g., output by augmented reality subsystem 112, as described below). In some embodiments, the user may be instructed to prepare the interior space in some other manner. Mapping subsystem 114 may include any of the information described above, any of the user input described above, or any other information in the mapping.

Figure 2:
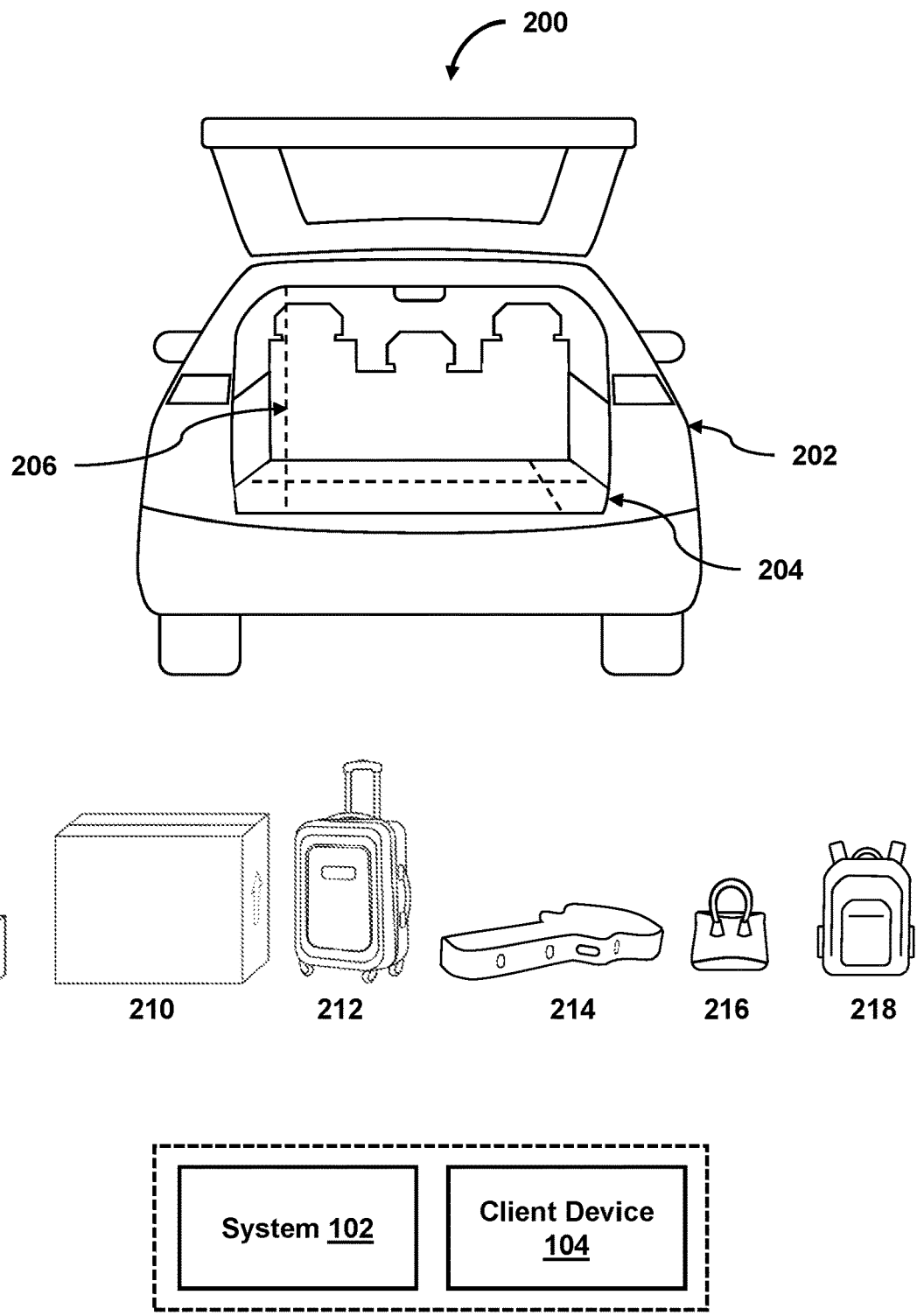
FIG. 2 shows an image of an interior space of a vehicle and a plurality of objects to be placed within the interior space, in accordance with one or more embodiments.

In one scenario, with respect to FIG. 2, system 100 may identify a vehicle 202 and a plurality of objects (e.g., objects 208, 210, 212, 214, 216, and 218). As shown in system 200, system 100 may receive one or more images of vehicle 202 and objects 208-218 via image capture subsystem 120 of client device(s) 104. In some embodiments, augmented reality subsystem 112 of system 102 may determine the measurements 206 of the interior space 204 of vehicle 202 or objects 208-218 based on the images (e.g., as described above). In some embodiments, mapping subsystem 114 of system 102 may generate a three-dimensional mapping of interior space 204 based on the images (e.g., as described above). In some embodiments, system 100 may compare the images of vehicle 202 or objects 208-218 to database(s) 132 to identify a matching vehicle model or matching objects. System 100 may thereby obtain measurements 206 of the vehicle and various measurements or characteristics of one or more of objects 208-218 from database(s) 132. In some embodiments, objects 208-218 may be a selection of default objects to be placed within interior space 204 (e.g., the selection may be received via user interface subsystem 122 of client device(s) 104). In some embodiments, system 100 may receive user-uploaded measurements, characteristics, or preferences of vehicle 202 or objects 208-218 via user interface subsystem 122 of client device(s) 104. For example, the user may input the following characteristics: object 208 is fragile, object 210 has a fixed orientation and is heavy, object 214 should be placed in a flat position and is rigid, object 216 should be placed into interior space 204 last, and objects 216 and 218 have the highest priority.

In some embodiments, positioning subsystem 116 determines an arrangement of one or more objects within an interior space of a vehicle. In some embodiments, the arrangement may depend on a mapping or measurements of the interior space (e.g., via database(s) 132, augmented reality subsystem 112 or mapping subsystem 114), measurements of the objects (e.g., via database 132 or augmented reality subsystem 112), characteristics of the objects, or other factors. In some embodiments, positioning subsystem 116 may determine one or more arrangements for the objects such that a maximum number of objects fits within the interior space. In some embodiments, one or more objects may be excluded due to lack of space. In some embodiments, positioning subsystem 116 may maximize the number of objects that fit into the interior space. In some embodiments, positioning subsystem 116 may determine that mapping subsystem 114 has identified a flexible mapping of the interior space and that additional portions of the interior space are/are not necessary in order to fit all of the objects. In some embodiments, positioning subsystem 116 may use one or more algorithms to determine the arrangements. For example, algorithms operating according to first fit, next fit, best fit, or other principles may be used. A first fit algorithm may comprise placing an object on a lowest level (e.g., within the interior space) in which the object will fit. If the object does not fit on any level of the arrangement, a new level is created. A next fit algorithm may comprise placing an object on a current level of the arrangement if it fits and creating a new level if it does not. A best fit algorithm may comprise packing the object on any level (in which the object fits) that leaves the least residual space around the object. Other placement algorithms may be used according to preferences or characteristics of the objects. In some embodiments, multiple phase algorithms may be used for determining the arrangement. For example, algorithms described above (and other algorithms) may be combined in order to determine an arrangement of the objects.

In some embodiments, positioning subsystem 116 may determine several different arrangements (e.g., according to different or the same criteria). The user may select an arrangement from the different arrangements. For example, the user may select an arrangement that fits the most items or that accommodates for the most characteristics of the objects (e.g., fragility, orientation, etc.). In some embodiments, the user may select an arrangement based on how many and which objects fit into the arrangement (e.g., if not all objects fit in every arrangement). In some embodiments, the user may select an arrangement of the different arrangements based on some other criteria.

In some embodiments, positioning subsystem 116 may take into account characteristics of the objects when determining the arrangements. For example, characteristics of the objects may include fragility, rigidity, weight, maneuverability, orientation, priority, or other characteristics. In some embodiments, each of these characteristics may be considered in relation to the other objects to be placed within the interior space. Certain characteristics (e.g., fragility, rigidity, weight, maneuverability, orientation, or other characteristics) may be preprogrammed or input by the user (e.g., via user interface subsystem 122 of client device(s) 104). Certain characteristics (e.g., priority or other characteristics) may be input by the user. For example, a user may input a characteristic of an object by indicating whether or not the object has that characteristic (e.g., "yes" for fragility, "no" for rigidity). A user may input a characteristic of an object by indicating a score of the characteristic with respect to that object (e.g., fragility score of 8 out of 10). A user may input a characteristic of an object by moving a sliding scale for the characteristic with respect to the object (e.g., by interacting with user interface subsystem 122). A user may rank objects with respect to a particular characteristic (e.g., heaviest to lightest objects). A user may indicate the importance (or lack of importance) that all objects fit within the interior space (e.g., by indicating an importance score). A user may use these or other methods of indicating various characteristics of objects.

In some embodiments, a characteristic of an object may determine where the object may be placed within the interior space. In some embodiments, a characteristic of an object may determine where the object may be placed relative to other objects. For example, the heaviest object to be placed within the interior space may be designated to a position along the bottom surface of the interior space. In another example, the most fragile object may be designated to the top layer of the arrangement, while the most rigid objects may be placed on the bottom layer of the arrangement. In another example, an object with low maneuverability may be placed first into the interior space (and thus on the bottom layer). In another example, an object with a predefined orientation (e.g., must be kept upright) may be placed within an area of the interior space that can accommodate the required orientation (e.g., an area that is tall and/or wide enough for the required orientation). In some embodiments, positioning subsystem 116 may give different weights to the characteristics of the objects. For example, fragility of objects may be weighed more heavily than maneuverability of objects. In another example, priority of objects may be weighed more heavily than weight of objects. In some embodiments, positioning subsystem 116 may allow for user input regarding relative weights of various characteristics of objects. For example, the user may specify that priority of objects (e.g., which objects must be placed within the interior space versus which objects may be left out if there is not enough space) should be weighed most heavily. In another example, the user may specify that weight of objects should not be factored into the arrangement of the objects. In some embodiments, the user may specify a desired location of a particular object. Positioning subsystem 116 may place the object in the desired location within the arrangement and may determine the remainder of the arrangement accordingly. These and other factors may be used by positioning subsystem 116 in determining arrangement 302.

Figure 3:
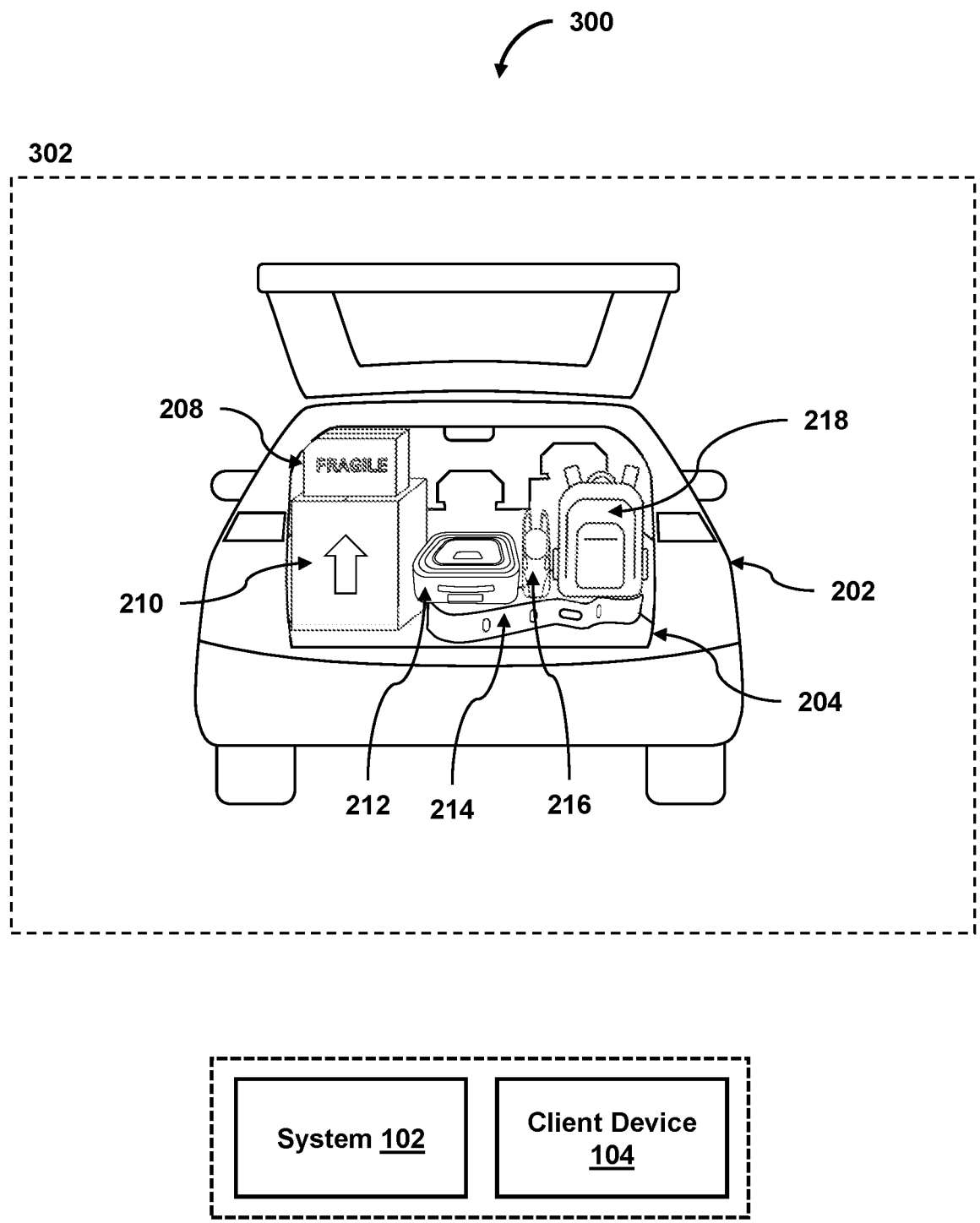
FIG. 3 shows an arrangement of the objects within the interior space of the vehicle, in accordance with one or more embodiments.

In one scenario, as shown in FIG. 3, system 102 may determine an arrangement 302 of objects 208-218 within interior space 204 of vehicle 202. As shown in system 300, arrangement 302 may be determined by positioning subsystem 116 of system 102. For example, arrangement 302 may be based upon a three-dimensional mapping of interior space 204 (e.g., as generated by mapping subsystem 114), measurements of objects 208-218, or characteristics of objects 208-218. For example, positioning subsystem 116 of system 102 may receive input from user interface subsystem 122 of client device(s) 104 indicating that object 208 is fragile, object 210 has a fixed orientation and is heavy, object 214 should be kept flat and is rigid, object 216 should be placed last, and objects 216 and 218 have the highest priority. Positioning subsystem 116 may place object 208 at the top of arrangement 302 such that no other objects are above object 208 (i.e., due to the fragility of object 208), as shown in arrangement 302. Positioning subsystem 116 may place object 210 in the required orientation and at the bottom of arrangement 302 (i.e., due to the heaviness of object 210), as shown in arrangement 302. Positioning subsystem 116 may place object 214 in a flat position and at the bottom of the arrangement (i.e., due to the required orientation and rigidity of object 214), as shown in arrangement 302. Finally, positioning subsystem 116 may place object 216 in an accessible location within arrangement 302 (i.e., due to the indication that object 216 should be placed last), as shown in arrangement 302. In this example, positioning subsystem 116 may leave a portion of interior space 204 (e.g., above object 212) empty for visibility purposes (e.g., so that a driver of vehicle 202 may see out a back window via a rearview mirror). In some embodiments, if not all of objects 208-218 are able to fit in interior space 204, positioning subsystem 116 may generate an arrangement which fits as many objects as possible or which accounts for the various characteristics of objects 208-218. For example, in any arrangement, positioning subsystem 116 should include objects 216 and 218, as those objects have the highest priority.

In some embodiments, once positioning subsystem 116 has determined one or more arrangements for the objects, ordering subsystem 118 may determine an order which is possible based on the mapping of interior space 204. For example, objects 208-218 may all fit in interior space 204 but they may need to be placed in interior space 204 in a particular order (e.g., so that each object can fit through the doorways and open spaces of vehicle 202). In some embodiments, ordering subsystem 118 may determine an order in which the objects must be placed in the interior space such that arrangement is feasible. Ordering subsystem 118 may order objects according to position in the arrangement (e.g., from bottom to top, back to front, hard-to-reach areas to easily accessible areas, or other orders). For example, heavy objects, objects at the bottom or in hard-to-reach areas of the interior space, or objects with other characteristics may be placed first. In some embodiments, ordering subsystem 118 may take into account user input or preferences regarding the ordering of the objects. For example, the user may prefer to place a purse into the interior space last. In some embodiments, ordering subsystem 118 may determine a series of placement steps indicating the order in which the objects are to be placed within the interior space (e.g., according to the factors mentioned above or other factors). In some embodiments, ordering subsystem 118 may output the placement steps to the user (e.g., via display subsystem 124 of client device(s) 104).

In some embodiments, augmented reality subsystem 112 may generate an augmented reality presentation comprising an arrangement of the objects within the interior space (e.g., as output by positioning subsystem 116) along with placement steps (e.g., as output by ordering subsystem 118). In some embodiments, the augmented reality subsystem 112 may generate the augmented reality presentation for display (e.g., via user interface subsystem 122 or display subsystem 124 of client device(s) 104). Augmented reality subsystem 112 may simulate the placement of the objects within the interior space according to the placement steps determined by ordering subsystem 118. For example, augmented reality subsystem 112 may display a simulation of the vehicle including the interior space and simulations of the objects to be placed within the interior space. Augmented reality subsystem 112 may display the simulated objects being placed in the arrangement within the interior space according to the placement steps. In some embodiments, augmented reality subsystem 112 may superimpose the simulated objects onto a video stream of the interior space of the vehicle (e.g., as captured by image capture subsystem 120). Augmented reality subsystem 112 may then simulate the placement of the simulated objects within the interior space as captured by the video stream. In some embodiments, the presentation may be interactive or may adapt to user input (e.g., received via user interface subsystem 122). For example, augmented reality subsystem 112 may respond to user input requesting to repeat a placement step simulation, switch to a different arrangement, change a preference (e.g., regarding priority of an object), or other input. In another example, if the user inputs feedback requesting to move an object, switch objects, remove an object, add an object, or other feedback, augmented reality subsystem 112 may generate an updated presentation based on the feedback. In some embodiments, the user may select from multiple presentations or presentation types. For example, presentation types may include simulated, animated, step-by-step, list view, three-dimensional, two-dimensional, voice-narrated, projected, or other presentation types.

Figure 4:
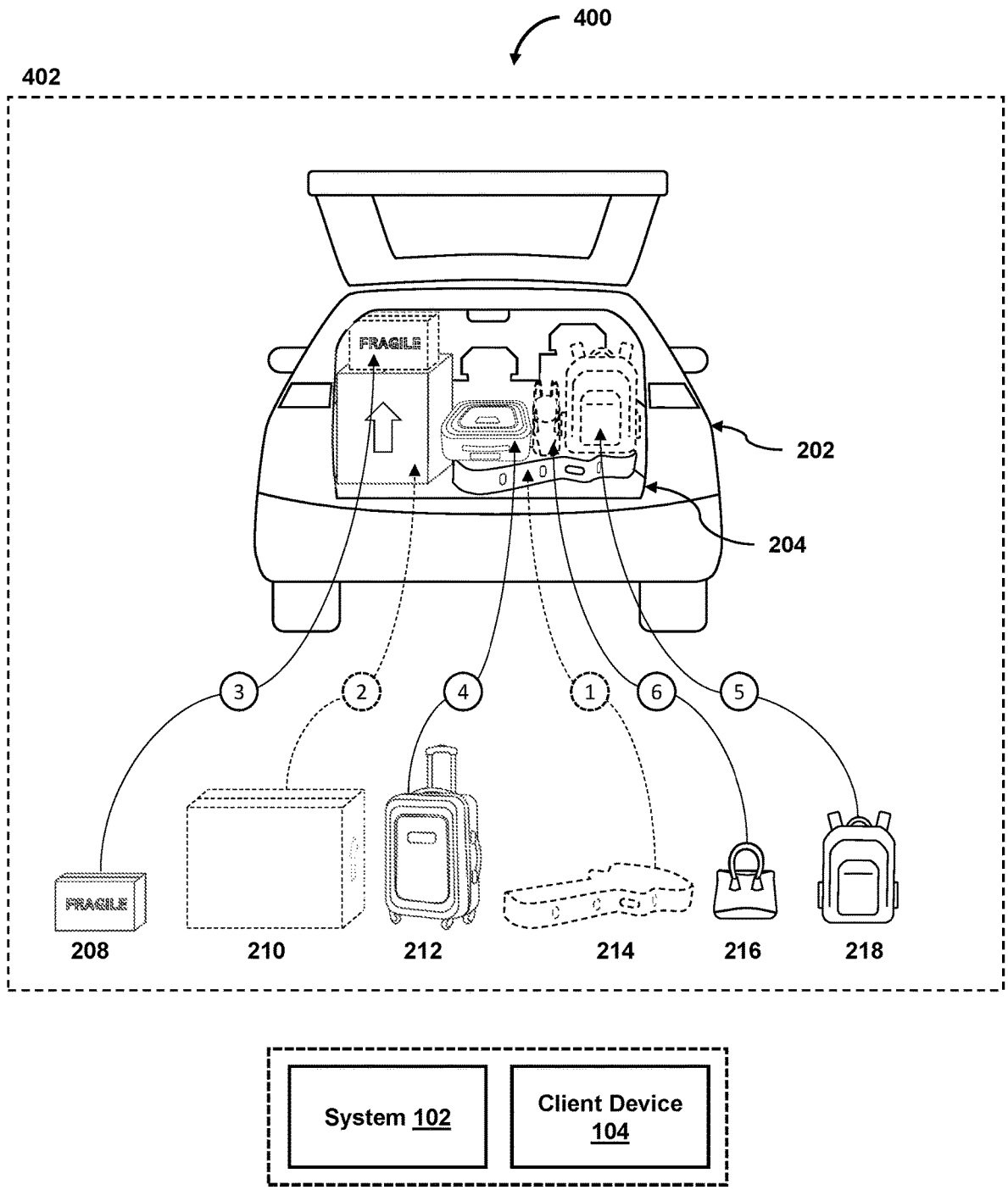
FIG. 4 shows an augmented reality presentation simulating placement of the objects within the interior space of the vehicle, in accordance with one or more embodiments.

In one scenario, as shown in FIG. 4, system 100 may display (e.g., via user interface subsystem 122 or display subsystem 124 of client device(s) 104) an augmented reality presentation 402 simulating (e.g., via augmented reality subsystem 112) placement of objects 208-218 within an interior space 204 of a vehicle 202. In some embodiments, augmented reality subsystem 112 may display the individual placement of each of objects 208-218 according to an arrangement (e.g., arrangement 302, as shown in FIG. 3, as generated by positioning subsystem 116, as shown in FIG. 1) in the order of a plurality of steps (e.g., as determined by ordering subsystem 118, as shown in FIG. 1). As shown in system 400, augmented reality subsystem 112 has already simulated placement of several objects (e.g., objects 214 and 210) and displays step 3 as the next simulated placement step. In some examples, object 214 may be placed first due to its position at the bottom of the arrangement (e.g., arrangement 302, as shown in FIG. 3) and its irregular shape. As shown in system 400, augmented reality subsystem 112 has already simulated the placement of object 214 in interior space 204. Object 210 may be placed second due to its large size, heaviness, and required orientation. As shown in system 400, augmented reality subsystem 112 has already simulated the placement of object 210 in interior space 204. Object 208 may be placed in interior space 204 at step 3. As shown in step 3 of FIG. 4, augmented reality subsystem 112 simulates placement of object 208 in interior space 204 according to the determined arrangement (e.g., arrangement 302, as shown in FIG. 3). As shown in step 4 of FIG. 4, augmented reality subsystem 112 simulates placement of object 212 in interior space 204 according to the determined arrangement. As shown in step 5 of FIG. 4, augmented reality subsystem 112 simulates placement of object 218 in interior space 204 according to the determined arrangement. As shown in step 6 of FIG. 4, augmented reality subsystem 112 simulates placement of object 216 in interior space 204 according to the determined arrangement. In this example, object 216 is placed last into interior space 204 based on user input (e.g., received via user interface subsystem 122) indicating that object 216 should be placed into interior space 204 last. In some embodiments, augmented reality presentation 402 may be one presentation of multiple presentations generated by augmented reality subsystem 112. For example, in some embodiments, the user may select from multiple presentations or presentation types. In some embodiments, augmented reality subsystem 112 may adjust augmented reality presentation 402 based on user feedback or input (e.g., received via user interface subsystem 122). For example, the user may wish to view a step of augmented reality presentation 402 again, and augmented reality subsystem 112 may repeat the step accordingly. It should be noted that this example is not intended to be limiting, and other types of presentations may be used.

Figure 5:
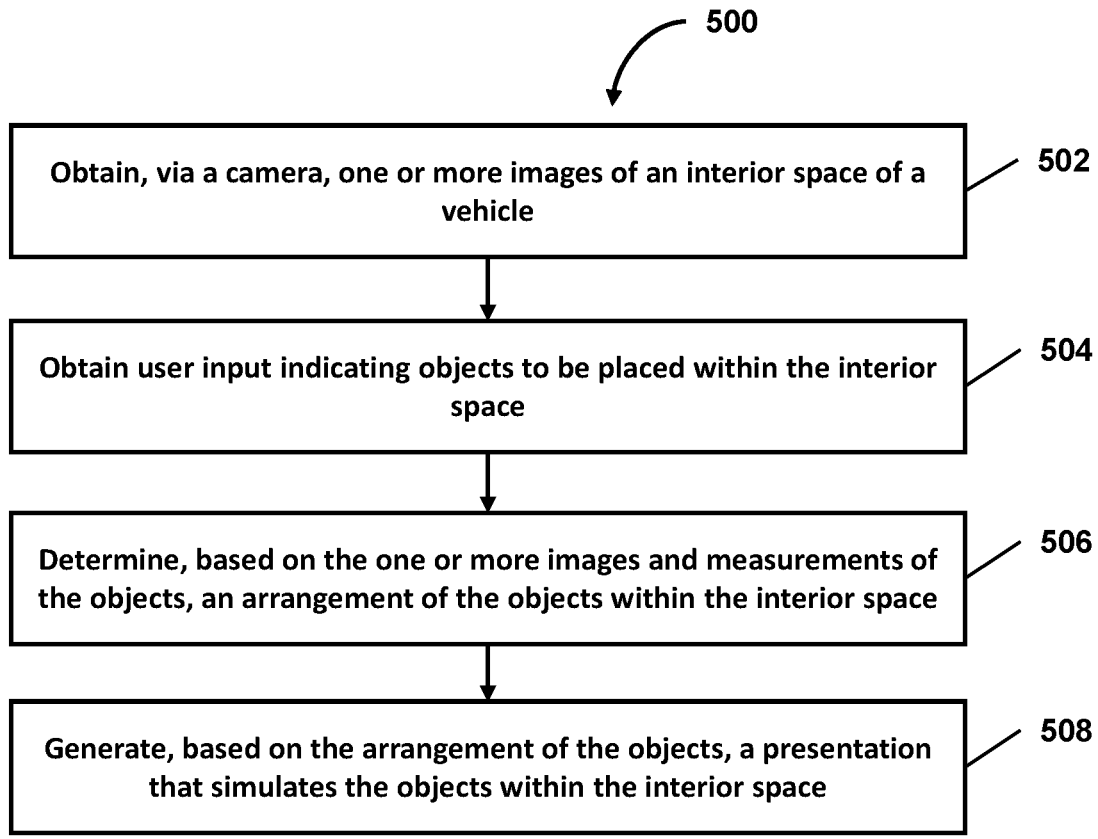
FIG. 5 shows a flowchart of a method of facilitating augmented reality positioning of objects within an interior space of a vehicle, in accordance with one or more embodiments.

FIG. 5 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a flowchart of a method 500 of facilitating augmented reality positioning of objects within an interior space of a vehicle, in accordance with one or more embodiments. In an operation 502, one or more images of an interior space of a vehicle may be obtained (e.g., via a camera or other optical sensory). The images may comprise a series of images, a scan, a video stream, or other images. Operation may be performed by a subsystem that is the same as or similar to image capture subsystem 120, in accordance with one or more embodiments.

In an operation 504, user input indicating objects to be placed within the interior space may be obtained. As an example, the user input may include a selection of one or more default objects (e.g., carry-on suitcase, guitar case, backpack, purse, moving box, etc.) or an upload of one or more images of objects (e.g., objects belonging to the user). In some embodiments, the objects may have predetermined measurements, the user may input measurements for the objects, or measurements of the objects may be obtained from a database. Operation 504 may be performed by a subsystem that is the same as or similar to user interface subsystem 122, in accordance with one or more embodiments.

In an operation 506, an arrangement of the objects may be determined based on the images of the interior space and measurements of the objects. The arrangement may depend on how a maximum number of the objects may fit within the interior space. In some embodiments, characteristics of the objects (e.g., fragility, rigidity, orientation, weight, priority, or other characteristics) or user preferences may impact the arrangement. In some embodiments, the user may input characteristics of the objects or preferences. For example, preferences may include the importance of fitting a maximum number of objects, priority of objects, ideal placement of objects, additional available space within the vehicle and willingness to use the additional space, or other preferences. In some embodiments, multiple arrangements may be determined such that the user is able to select a preferred arrangement. Operation 506 may be performed by a subsystem that is the same as or similar to positioning subsystem 116, in accordance with one or more embodiments.

In an operation 508, an augmented reality presentation that simulates the objects within the interior space is generated based on the arrangement of the objects. For example, the presentation may simulate placement of the objects into the interior space in a particular order. The order may be based upon characteristics of the objects (e.g., fragility, rigidity, orientation, weight, priority, or other characteristics) or user preferences. In some embodiments, the user may select from multiple presentations or presentation types. In some embodiments, the user may submit user feedback or input in order to modify the presentation. Operation 508 may be performed by a subsystem that is the same as or similar to augmented reality subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, which may include vehicle database(s) 134, object database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical-charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118, subsystems 120-124, and/or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 and subsystems 120-124 described herein is for illustrative purposes, and is not intended to be limiting, as any of subsystems 112-118 or subsystems 120-124 may provide more or less functionality than is described. For example, one or more of subsystems 112-118 or subsystems 120-124 may be eliminated, and some or all of its functionality may be provided by other ones of subsystems 112-118 or subsystems 120-124. As another example, additional subsystems may be programmed to perform some or all of the functionality attributed herein to one of subsystems 112-118 or subsystems 120-124.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:
1. A method comprising: obtaining, via a camera, one or more images of an interior space of a vehicle; obtaining user input indicating objects to be placed within the interior space; and determining, based on the one or more images and measurements of the objects, an arrangement of the objects within the interior space.
2. The method of embodiment 1, further comprising generating, based on the arrangement of the objects, a presentation that simulates the objects within the interior space.
3. The method of embodiments 1-2, further comprising determining a plurality of steps for arranging the objects in the interior space in accordance with the arrangement, wherein generating the presentation comprises generating, based on the plurality of steps, the presentation that simulates the objects within the interior space.
4. The method of any of embodiments 1-3, wherein the plurality of steps is provided according to an order in which the objects are to be arranged in the interior space.
5. The method of any of embodiments 1-4, further comprising determining the order based on the measurements of the objects and characteristics of the interior space.
6. The method of any of embodiments 1-5, further comprising determining the order based on fragility of the objects, weight of the objects, and maneuverability of the objects.
7. The method of any of embodiments 1-6, further comprising: determining, based on the one or more images, a type of the vehicle; and obtaining, based on the type of the vehicle, measurements of the interior space.
8. The method of any of embodiments 1-7, further comprising determining measurements of the interior space based on the one or more images.
9. The method of any of embodiments 1-8, wherein the user input comprises a selection of the objects from a default list of objects, the objects having preprogrammed measurements.
10. The method of any of embodiments 1-9, wherein the user input comprises an upload comprising one or more images of the objects and the measurements of the objects.
11. A tangible, non-transitory, machine-readable medium storing instructions that, when executed by a data processing apparatus, causes the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.

What is claimed is:

1. A system for facilitating augmented reality positioning of vehicle cargo objects within an interior vehicle space, the system comprising:
a computer system that comprises one or more processors programmed with computer program instructions that, when executed, cause the computer system to:
obtain, via a camera, a video stream of an interior space of a vehicle, wherein the video stream comprises a plurality of perspectives of the interior space of the vehicle, the plurality of perspectives comprising different seat position configurations of passenger seats within the interior space of the vehicle;
generate, based on the plurality of perspectives, a plurality of three-dimensional mappings of the interior space of the vehicle, the plurality of three-dimensional mappings comprising a first mapping for a first seat position configuration of the passenger seats and a second mapping for a second seat position configuration of the passenger seats different from the first seat position configuration;
determine, based on the plurality of three-dimensional mappings and measurements of cargo objects, different arrangements of the cargo objects within the interior space of the vehicle;
obtain, from the different arrangements, a user selection of a first arrangement of the cargo objects corresponding to the first seat position configuration, the first arrangement being selected over a second arrangement of the cargo objects corresponding to the second seat position configuration;
determine a plurality of placement steps for arranging the passenger seats and placing the cargo objects in the interior space of the vehicle in accordance with the selected first arrangement;
generate, based on the plurality of placement steps, an augmented reality presentation over the video stream that simulates arrangement of the passenger seats and placement of the cargo objects in the interior space of the vehicle; and
update, based on a user modification related to a stimulated cargo object of the augmented reality presentation, the selected first arrangement and the augmented reality presentation to reflect the updated first arrangement.

2. The system of claim 1, wherein the plurality of placement steps indicates an order in which the cargo objects are to be placed in the interior space of the vehicle, and wherein the augmented reality presentation is generated such that the augmented reality presentation simulates the arrangement of the passenger seats and the placement of the cargo objects in accordance with the order for the cargo objects.

3. The system of claim 2, further comprising determining the order for the cargo objects based on the measurements of the cargo objects and the plurality of three-dimensional mappings of the interior space of the vehicle.

4. The system of claim 1, wherein the plurality of three-dimensional mappings is generated based on (i) the plurality of perspectives and (ii) a user-indicated number of passengers that will be riding in the vehicle with cargo objects.

5. A method comprising: obtaining, via a camera, images of an interior space of a vehicle, the images comprising representations of passenger seats within the interior space of the vehicle; obtaining user input indicating objects to be placed within the interior space; determining, based on the images, mappings of the interior space of the vehicle, the mapping comprising a first mapping for a first seat configuration of the passenger seats and a second mapping for a second seat configuration of the passenger seats different from the first seat configuration; determining, based on the mappings and measurements of the objects, an arrangement of the objects within the interior space, wherein the arrangement of the objects corresponds to the first or second seat configuration of the passenger seats; generating, based on the arrangement of the objects, a presentation that simulates the objects within the interior space with respect to the corresponding first or second seat configuration; and updating, based on a user modification related to a stimulated object of the presentation, the arrangement of the objects and the presentation to reflect the updated arrangement of the objects.

6. The method of claim 5, further comprising: determining a plurality of steps for arranging the objects in the interior space in accordance with the arrangement, wherein generating the presentation comprises generating, based on the plurality of steps, the presentation that simulates the objects within the interior space with respect to the corresponding first or second seat configuration.

7. The method of claim 6, wherein the plurality of steps is provided according to an order in which the objects are to be arranged in the interior space.

8. The method of claim 6, further comprising:
determining, based on the measurements of the objects and the corresponding first or second seat configuration, an order in which the objects are to be arranged in the interior space,
wherein determining the plurality of steps comprises determining, based on the order and the arrangement, the plurality of steps for arranging the objects in the interior space.

9. The method of claim 5, wherein the mappings are determined based on (i) the images and (ii) a number of passengers that will be riding in the vehicle with the objects.

10. The method of claim 5, wherein generating the presentation comprises generating an augmented reality presentation over a video stream of the vehicle that stimulates arrangment of the passenger seats and placement of the objects in the interior space of the vehicle.

11. The method of claim 5, wherein updating the presentation comprises updating, based on a user movemnt or removal of a simulated object of the presentation, the arrangement of the objects and the presentation to reflect the updated arrangement of the objects.

12. The method of claim 5, wherein the user input comprises a selection of the objects from a default list of objects, the objects having preprogrammed measurements.

13. The method of claim 5, wherein the user input comprises an upload comprising one or more images of the objects and the measurements of the objects.

14. A non-transitory computer-readable media comprising instructions that, when executed by one or more processors, cause operations comprising: obtaining, via a camera, one or more images of an interior space of a vehicle, the one or more images comprising representations of passenger seats within the interior space of the vehicle; obtaining user input indicating objects to be placed within the interior space; determining, based on the one or more images, mappings of the interior space of the vehicle, the mapping comprising a first mapping for a first seat configuration of the passenger seats and a second mapping for a second seat configuration of the passenger seats different from the first seat configuration; determining, based on the mappings and measurements of the objects, an arrangement of the objects within the interior space, wherein the arrangment of the objects corresponds to the first or second seat configuration of the passenger seats; and generating, based on the arrangement of the objects, a presentation that simulates the objects within the interior space.

15. The non-transitory computer-readable media of claim 14, the operations further comprising determining a plurality of steps for arranging the objects in the interior space in accordance with the arrangement, wherein generating the presentation comprises generating, based on the plurality of steps, the presentation that simulates the objects within the interior space.

16. The non-transitory computer-readable media of claim 15, the operations further comprising:
determining, based on the measurements of the objects and the corresponding first or second seat configuration, an order in which the objects are to be arranged in the interior space,
wherein determining the plurality of steps comprises determining, based on the order and the arrangement, the plurality of steps for arranging the objects in the interior space.

17. The non-transitory computer-readable media of claim 14, the operations further comprising updating, based on a user modification related to a stimulated object of the presentation, the arrangement of the objects and the presentation to reflect the updated arrangement of the objects.

18. The non-transitory computer-readable media of claim 14, the operations further comprising updating, based a user movement or removal of a simulated object of the presentation, the arrangement of the objects and the presentation to reflect the updated arrangement of the objects.

19. The non-transitory computer-readable media of claim 14, wherein generating the presentation comprises generating an augmented reality presentation over a video stream of the vehicle that simulates arrangement of the passenger seats and placement of the objects in the interior space of the vehicle.

20. The non-transitory computer-readable media of claim 14, wherein the mappings are determined based on (i) the one or more images and (ii) a number of passengers that will be riding in the vehicle with the objects.

21. The non-transitory computer-readable media of claim 14, wherein the user input comprises a selection of the objects from a default list of objects, the objects having preprogrammed measurements.

22. The non-transitory computer-readable media of claim 14, wherein the user input comprises an upload comprising one or more images of the objects and the measurements of the objects.

* * * * *